United States Patent
Yamada

(10) Patent No.: US 8,754,747 B2
(45) Date of Patent: Jun. 17, 2014

(54) AUTHENTICATION DEVICE, AUTHENTICATION SYSTEM, AND AUTHENTICATION METHOD

(75) Inventor: Shigefumi Yamada, Sagamihara (JP)

(73) Assignee: Fujitsu Limited, Kawasaki (JP)

(*) Notice: Subject to any disclaimer, the term of this patent is extended or adjusted under 35 U.S.C. 154(b) by 140 days.

(21) Appl. No.: 13/560,289

(22) Filed: Jul. 27, 2012

(65) Prior Publication Data
US 2013/0038426 A1    Feb. 14, 2013

Related U.S. Application Data

(63) Continuation of application No. PCT/JP2010/051167, filed on Jan. 28, 2010.

(51) Int. Cl.
*G06F 7/04* (2006.01)
*G06K 9/00* (2006.01)

(52) U.S. Cl.
CPC ........................ *G06K 9/00* (2013.01)
USPC ........................ 340/5.83; 340/5.53

(58) Field of Classification Search
CPC ...... G06K 9/001; G06K 9/00; G06K 9/00006
USPC .................. 340/5.83, 1.1, 5.1, 5.8, 5.81, 5.53
See application file for complete search history.

(56) References Cited

U.S. PATENT DOCUMENTS

| 2004/0255128 A1 | 12/2004 | Ohba |
| 2005/0047632 A1 | 3/2005 | Miura et al. |
| 2008/0077359 A1 | 3/2008 | Ito |
| 2008/0137920 A1 | 6/2008 | Miura et al. |
| 2012/0013436 A1 | 1/2012 | Niinuma |

FOREIGN PATENT DOCUMENTS

| JP | 10-302047 | 11/1998 |
| JP | 2004-342073 | 12/2004 |
| JP | 2005-71118 | 3/2005 |
| JP | 2007-11764 | 1/2007 |
| JP | 2008-77518 | 4/2008 |
| JP | 2008-79680 | 4/2008 |
| JP | 2008-102770 | 5/2008 |
| WO | WO 2010/116470 | 10/2010 |

OTHER PUBLICATIONS

International Search Report of Corresponding PCT Application PCT/JP2010/051167 mailed Mar. 9, 2010.

*Primary Examiner* — Brian Zimmerman
*Assistant Examiner* — Sara Samson
(74) *Attorney, Agent, or Firm* — Staas & Halsey LLP

(57) ABSTRACT

Provided are an authentication device, an authentication system, and an authentication method, which are capable of increasing an authentication rate while suppressing an increase in a processing load. To solve this problem, the authentication device acquires a periodic temporal variation of an authentication rate, using history information stored in an authentication history storage unit storing a previous authentication result as history information, predicting whether or not a future authentication rate is lower than a previous value, based on the temporal variation of the authentication rate, and updates registration data regarding biometric information which has been registered, using input data regarding biometric information input from a user, when it is predicted that a future authentication rate will be lower than a predetermined value.

9 Claims, 14 Drawing Sheets

| USER ID | DATE/TIME | AUTHENTICATION RESULT | DEGREE OF SIMILARITY | INPUT FEATURE DATA QUALITY VALUE |
|---|---|---|---|---|
| U001 | 20090918090000 | OK | 90 | 8 |
| U002 | 20090918091000 | NG | 50 | 4 |
| U001 | 20090919090000 | NG | 60 | 5 |
| U003 | 20090919100000 | OK | 80 | 9 |
| U002 | 20090919103000 | NG | 40 | 4 |
| U004 | 20090919113000 | OK | 70 | 7 |
| U005 | 20090920090000 | NG | 20 | 2 |
| U003 | 20090920091000 | NG | 60 | 5 |
| ... | ... | ... | ... | ... |

| USER ID | SHORT-TERM ANALYSIS RESULT | LONG-TERM ANALYSIS RESULT |
|---|---|---|
| U001 | 0 | 0 |
| U002 | 0 | 1 |
| U003 | 1 | 1 |
| ... | ... | ... |

| USER ID | SHORT-TERM ANALYSIS RESULT | LONG-TERM ANALYSIS RESULT | | PRIORITY |
|---|---|---|---|---|
| | | PERIODIC | AVERAGE | |
| U011 | 1 | 1 | 1 | 1 |
| U012 | 1 | 0 | 1 | 2 |
| U013 | 0 | 1 | 0 | 3 |
| U014 | 0 | 0 | 1 | 4 |
| U015 | 0 | 0 | 1 | 5 |
| ... | ... | ... | ... | ... |

| ANALYSIS METHOD | DEGREE OF IMPORTANCE |
|---|---|
| SHORT-TERM ANALYSIS | HIGH |
| LONG-TERM ANALYSIS (PERIODIC) | MIDDLE |
| LONG-TERM ANALYSIS (AVERAGE) | LOW |

| USER ID | PERIOD | CAUSE |
|---------|--------|-------|
| U011 | JANUARY 2007 | PERIODIC |
| U012 | JANUARY 2007 | PERIODIC |
| U013 | JANUARY 2007 | AVERAGE |
| ... | ... | ... |
| U011 | JANUARY 2008 | PERIODIC |
| U013 | FEBRUARY 2008 | PERIODIC |
| ... | ... | ... |

AUTHENTICATION DEVICE, AUTHENTICATION SYSTEM, AND AUTHENTICATION METHOD

CROSS-REFERENCE TO RELATED APPLICATION

This application is a continuation application of International Application No. PCT/JP2010/051167, filed on Jan. 28, 2010, the entire contents of which are incorporated herein by reference.

FIELD

The present invention relates to an authentication device, an authentication system, and an authentication method.

BACKGROUND

In the related art, there is known a biometric authentication technology that performs authentication using biometric information such as a fingerprint or the like. An authentication device that performs biometric authentication retains data generated based on biometric information as registration data. When data to be matched is input, the authentication device matches the input data and registration data and determines success or failure of authentication, based on degree of similarity between the input data and the registration data.

In such a biometric authentication technology, since biometric information of a user varies with time elapse, an authentication rate may be decreased. Therefore, in recent years, there has been proposed an authentication device that updates registration data with input data received from a user when authentication succeeds. In the case of using such an authentication device, since the registration data is updated with latest data, an authentication rate may be improved.
Patent Literature 1: Japanese Laid-open Patent Publication No. 2008-102770

SUMMARY

However, in the above-described related art, there has been a problem in that a processing load is increased. Specifically, the conventional authentication device performs processing to retain input data, which is input at the time of authentication, and generate registration data from the input data when the authentication succeeds. For example, in the case in which the related art is applied to a large-scale authentication system that is used by more than thousands of users, an authentication device performs a number of registration data update processing as well as a number of authentication processing, when a number of authentication requests are concentrated. This increases a processing load of the authentication device and causes a problem that processing of answering an authentication result is delayed.

According to an aspect of an embodiment of the invention, an authentication device includes a registration data storage unit that stores biometric information of a user as registration data; an authentication unit that performs authentication processing by matching input data, which is biometric information input by the user, and registration data, which is stored in the registration data storage unit; an authentication history storage unit that stores an authentication result authenticated by the authentication unit as history information; a prediction unit that acquires a periodic temporal variation of an authentication rate, which succeeds in authentication, using the history information stored in the authentication history storage unit, and predicts whether or not a future authentication rate is lower than a first threshold value, from an authentication rate after a previous time point by a period included in the temporal variation; and an updating unit that updates registration data stored in the registration data storage unit, based on the input data, when it is predicted by the prediction unit that a future authentication rate will be lower than the first threshold value.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating an example of an authentication history storage unit in the second embodiment.

FIG. 4 is a diagram illustrating an example of an analysis result storage unit in the second embodiment.

FIG. 15 is a diagram illustrating an example of an analysis result storage unit in the third embodiment.

FIG. 16 is a diagram illustrating an example of an importance degree storage unit in the third embodiment.

FIG. 17 is a diagram illustrating an example of a decrease cause storage unit.

DESCRIPTION OF EMBODIMENTS

Hereinafter, embodiments of an authentication device, an authentication system, and an authentication method disclosed in the present application will be described in detail with reference to the accompanying drawings. Also, the authentication device, the authentication system, and the authentication method disclosed in the present application are not limited by these embodiments.

[a] First Embodiment

Figure 1:
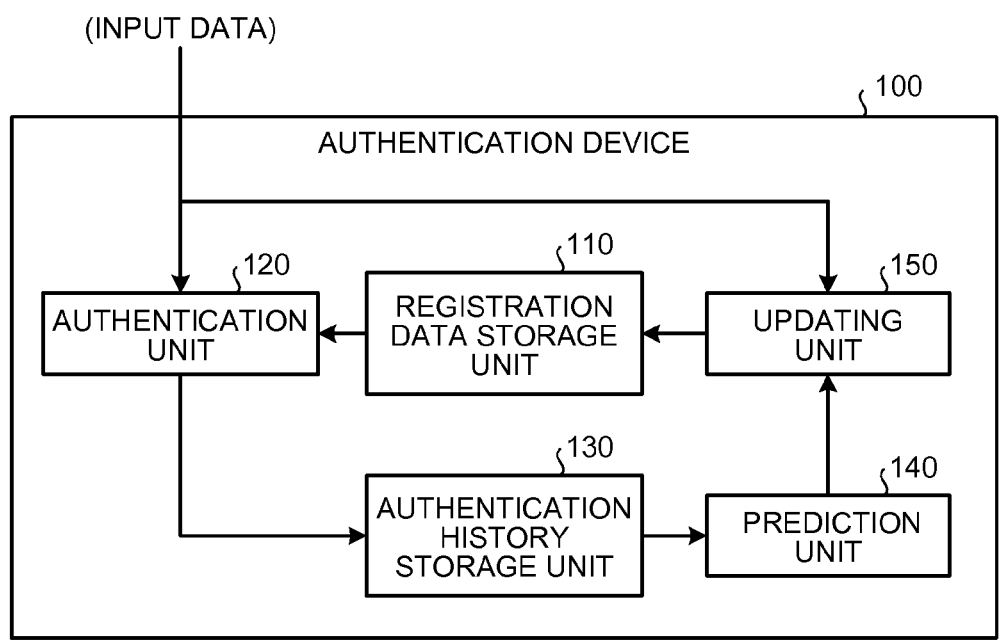
FIG. 1 is a diagram illustrating an example of a configuration of an authentication device according to a first embodiment.

First, an authentication device according to a first embodiment will be described with reference to FIG. 1. FIG. 1 is a diagram illustrating an example of a configuration of the authentication device according to the first embodiment. As illustrated in FIG. 1, an authentication device 100 according to the first embodiment includes a registration data storage unit 110, an authentication unit 120, an authentication history storage unit 130, a prediction unit 140, and an updating unit 150.

The registration data storage unit 110 stores biometric information of a user as registration data. When data related to biometric information is input from a user, the authentication unit 120 performs authentication processing by matching the input data and the registration data stored in the registration data storage unit 110. The authentication history storage unit 130 stores an authentication result authenticated by the authentication unit 120 as history information.

The prediction unit 140 acquires a periodic temporal variation of an authentication success probability (hereinafter, referred to as an "authentication rate") using the history information stored in the authentication history storage unit 130. Subsequently, the prediction unit 140 specifies a past time point by a period of a temporal variation from a present time point in the acquired temporal variation of the authentication rate. Subsequently, the prediction unit 140 predicts whether or not a future authentication rate will be lower than a first threshold value, based on the authentication rate after a specified past time point.

When the prediction unit 140 predicts that the future authentication rate will be lower than the first threshold value, the updating unit 150 updates the registration data that is stored in the registration data storage unit 110, based on the input data.

As described above, the authentication device 100 according to the first embodiment predicts whether or not a future authentication rate will be decreased, by using a temporal variation of a periodically-varying authentication rate. The authentication device 100 updates the registration data when the future authentication rate is predicted to be decreased. Therefore, the authentication device 100 according to the first embodiment may predict registration data, which will be difficult to authenticate in the future, and perform registration data updating processing.

For example, there are users whose palm state is changed only in a specific period or whose palm state is changed when the season changes. This is because there are cases in which a palm becomes dry in winter or a palm becomes wet in summer according to a user's constitution. An authentication rate of these users is decreased with constant periods. For example, an authentication rate of a user whose palm easily becomes dry in winter may be decreased for the November-February period. The authentication device 100 according to the first embodiment predicts whether or not the future authentication rate will be decreased, based on the periodical temporal variation of the authentication rate. In other words, the authentication device 100 according to the first embodiment may increase the authentication rate because a user whose authentication rate is decreased may be specified before the authentication rate is decreased.

Also, for example, even when the authentication device is used by a plurality of users, the authentication device 100 according to the first embodiment performs registration data updating processing on registration data, which will be difficult to authenticate in the future, without performing registration data updating processing on all users. Therefore, the authentication device 100 according to the first embodiment may suppress an increase in a processing load, even when the authentication device is used by a plurality of users.

From the above, the authentication device 100 according to the first embodiment may increase an authentication rate while suppressing an increase in a processing load.

[b] Second Embodiment

Next, the authentication device described in the first embodiment will be described using a specific example. In the second embodiment, an example that applies the authentication device described in the first embodiment to an authentication system will be described. Also, although an example of an authentication system employing a fingerprint authentication as an authentication method will be described in the following embodiment, the authentication device or the authentication system disclosed in this application may also employ a palm print authentication or a vein authentication.

[Configuration of Authentication System According to Second Embodiment]

Figure 2:
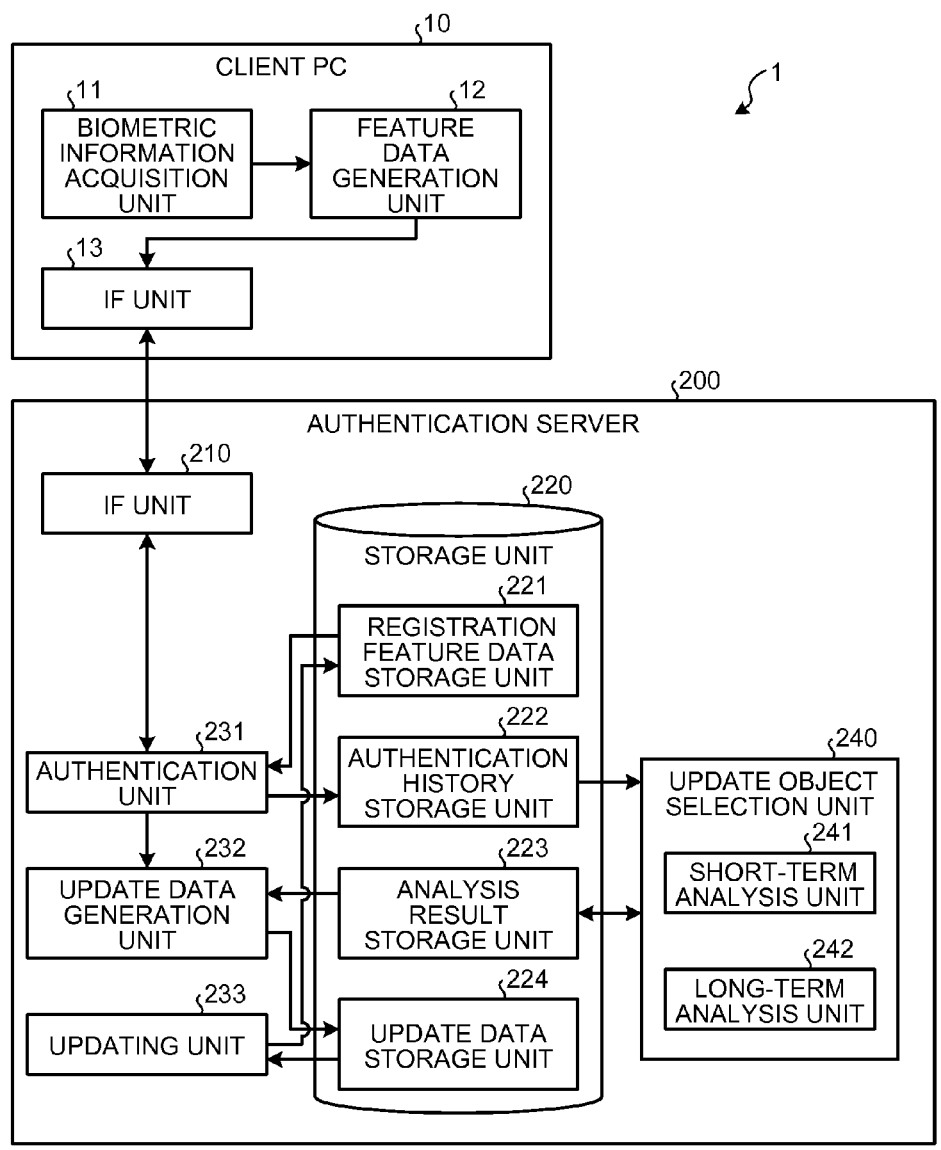
FIG. 2 is a diagram illustrating an example of a configuration of an authentication system according to a second embodiment.

First, a configuration of an authentication system according to a second embodiment will be described with reference to FIG. 2. FIG. 2 is a diagram illustrating an example of the configuration of the authentication system according to the second embodiment. An authentication system 1 illustrated in FIG. 2 is a system that performs a fingerprint authentication. As illustrated in FIG. 2, the authentication system 1 according to the second embodiment includes a client PC (personal computer) 10 and an authentication server 200.

The client PC 10 and the authentication server 200 mutually transmit and receive a variety of information through a wire communication or a wireless communication. The client PC 10 is an information processing device that is used by a user. In the example illustrated in FIG. 2, when a user of the client PC 10 logs in to the client PC 10, it is requested to perform a fingerprint authentication. As illustrated in FIG. 2, the client PC 10 includes a biometric information acquisition unit 11, a feature data generation unit 12, and an IF (interface) unit 13.

The biometric information acquisition unit 11 acquires biometric information of a user. In the second embodiment, the biometric information acquisition unit 11 is assumed to be a fingerprint sensor. In other words, the biometric information acquisition unit 11 acquires a fingerprint image as the biometric information of a user when the biometric information acquisition unit 11 is pressed with a user's finger, or the fingerprint pressing the biometric information acquisition unit 11 is moved. For example, the biometric information acquisition unit 11 acquires a fingerprint image using any one of a capacitive detection method, a thermosensitive detection method, an electric field type detection method, and an optical detection method. Also, when the fingerprint image is acquired from the user by the biometric information acquisition unit 11, the client PC 10 receives an input of a user ID, which identifies the user, from the user.

The feature data generation unit 12 extracts a feature amount of the fingerprint image acquired by the biometric information acquisition unit 11, and generates feature data that is data representing the extracted feature amount. For example, the feature data generation unit 12 specifies an ending point or a branch point of a fingerprint ridge, and extracts a feature amount based on a position or direction of the specified ending point or branch point as a feature point. Also, for example, the feature data generation unit 12 extracts a feature amount from patterns of a fingerprint ridge, frequency information of a fingerprint ridge, or the like.

The IF unit 13 transmits and receives a variety of information to/from the authentication server 200. For example, the IF unit 13 transmits an authentication request, including the feature data generated by the feature data generation unit 12 and the user ID input by the user, to the authentication server 200. Also, for example, the IF unit 13 receives an authentication result from the authentication server 200.

Also, the client PC 10 may transmit the fingerprint image acquired by the biometric information acquisition unit 11 to the authentication server 200, without generating feature data. In this case, the authentication server 200 generates feature data of the fingerprint image.

As illustrated in FIG. 2, the authentication server 200 includes an IF unit 210, a storage unit 220, an authentication unit 231, an update data generation unit 232, an updating unit 233, and an update object selection unit 240.

The IF unit 210 transmits and receives a variety of information to/from the client PC 10. For example, when the IF unit 210 receives an authentication request from the client PC 10, the IF unit 210 outputs the authentication request to the authentication unit 231. Also, in the following, feature data included in the authentication request received from the client PC 10 may be referred to as "input feature data".

The storage unit 220 is a storage device that stores a variety of information. The storage unit 220 is a storage device, such as a semiconductor memory device, for example flash memory or the like, a hard disk, and an optical disk. As illustrated in FIG. 2, the storage unit 220 includes a registration feature data storage unit 221, an authentication history storage unit 222, an analysis result storage unit 223, and an update data storage unit 224.

The registration feature data storage unit 221 stores feature data of fingerprint image preregistered by the user (hereinafter, referred to as "registration feature data") with respect to each user ID identifying the user. For example, when the authentication system 1 is used by 1,000 users, the registration feature data storage unit 221 stores 1,000 combinations (1,000 records) of the user ID and the registration feature data.

The authentication history storage unit 222 stores history information of authentication processing performed by the authentication unit 231 to be described later. FIG. 3 is a diagram illustrating an example of the authentication history storage unit 222 in the second embodiment. In the example illustrated in FIG. 3, the authentication history storage unit 222 includes items, such as "user ID", "date and time", "authentication result, "degree of similarity", and "input feature data quality value".

The "user ID" is an identification number that identifies the user. The "date and time" is date and time when the authentication processing is performed by the authentication unit 231 to be described later. FIG. 3 illustrates an example in which year, month, day, hour, minute, and second are stored in the "date and time". The "authentication result" is information representing success or failure of the authentication result performed by the authentication unit 231. In the example illustrated in FIG. 3, the case in which "OK" is stored in the "authentication result" represents the success of the authentication, and the case in which "NG" is stored in the "authentication result" represents the failure of the authentication.

The "degree of similarity" is a degree of similarity between input feature data and registration feature data. In the example illustrated in FIG. 3, an upper limit of the degree of similarity is assumed to be "100", and a lower limit thereof is assumed to be "0". As the degree of similarity is closer to "100", it is represented that the input feature data and the registration feature data are similar to each other. The "input feature data quality value" is a value that represents quality of the input feature data. In the example illustrated in FIG. 3, an upper limit of the input feature data quality value is assumed to be "10", and a lower limit thereof is assumed to be "0". As the input feature data quality value is closer to "10", it is represented that the quality of the input feature data is better.

Therefore, the first row of the authentication history storage unit 222 illustrated in FIG. 3 represents that a user whose user ID is "U001" succeeds in authentication on 2009/09/18 09:00:00. It is represented that, upon the authentication processing, the degree of similarity between the input feature data and the registration feature data is "90", and the quality value of the input feature data is "8".

Also, the third row of the authentication history storage unit 222 illustrated in FIG. 3 represents that a user whose user ID is "U001" fails in authentication on 2009/09/19 09:00:00. It is represented that, upon the authentication processing, the degree of similarity between the input feature data and the registration feature data is "60", and the quality value of the input feature data is "5". In other words, in the example illustrated in FIG. 3, the user whose user ID is "U001" was authenticated as OK on 2009/09/18, but was authenticated as NG on 2009/09/19.

Returning to the description of FIG. 2, the analysis result storage unit 223 stores results of analysis processing performed by a short-term analysis unit 241 and a long-term analysis unit 242 to be described later. FIG. 4 is a diagram illustrating an example of the analysis result storage unit 223 in the second embodiment. In the example illustrated in FIG. 4, the analysis result storage unit 223 includes items, such as "user ID", "short-term analysis result", and "long-term analysis result".

The "user ID" corresponds to the "user ID" illustrated in FIG. 3. The "short-term analysis result" is information updated by the short-term analysis unit 241 to be described later, and is information representing whether or not the user is a user whose registration feature data of the registration feature data storage unit 221 is updated with new feature data (hereinafter, referred to as an "update object"). The "long-term analysis result" is information updated by the long-term analysis unit 242 to be described later, and is information representing whether or not the user is an update object, as similarly to the short-term analysis result. In FIG. 4, the case in which "0" is stored in the "short-term analysis result" or the "long-term analysis result" represents that the user is not the update object, and the case in which "1" is stored therein represents that the user is the update object. Also, a variety of information stored in the analysis result storage unit 223 will be described in detail, when describing the short-term analysis unit 241 and the long-term analysis unit 242.

The update data storage unit 224 stores data for updating the registration feature data stored in the registration feature data storage unit 221 (hereinafter, referred to as "update data"), in association with the user ID. Also, the update data is generated by the update data generation unit 232 to be described later.

When the authentication request is received from the client PC 10, the authentication unit 231 performs authentication processing and stores an authentication result or the like in the authentication history storage unit 222. Specifically, the authentication unit 231 acquires registration feature data, which corresponds to the user ID included in the authentication request, from the registration feature data storage unit 221. Subsequently, the authentication unit 231 calculates a degree of similarity between both data by comparing and matching the acquired registration feature data with the input feature data included in the authentication request. For example, the authentication unit 231 calculates the degree of similarity using a minutiae method, a pattern matching method, a frequency analysis method, and the like.

Then, the authentication unit 231 determines whether or not the calculated degree of similarity is greater than a predetermined threshold value (hereinafter, referred to as a "matching determination threshold value"). When the degree of similarity is greater than the matching determination threshold value, the authentication unit 231 determines that the authentication succeeds. When the degree of similarity is equal to or less than the matching determination threshold value, the authentication unit 231 determines that the authentication fails. Also, the authentication unit 231 calculates a quality value of the input feature data. For example, the authentication unit 231 calculates a quality value based on the number of feature points included in the input feature data, or the like. The authentication unit 231 stores date and time when the authentication processing is performed, an authentication result, a calculated degree of similarity, and a quality value in the authentication history storage unit 222, in association with a user ID. Also, the authentication unit 231 transmits the authentication result to the client PC 10 through the IF unit 210.

When the authentication processing is performed by the authentication unit 231, the update data generation unit 232 generates update data based on a variety of information stored in the analysis result storage unit 223. Specifically, the update data generation unit 232 acquires the short-term analysis result and the long-term analysis result, which correspond to the user ID included in the authentication request, from the analysis result storage unit 223. Then, when "1" is stored in the short-term analysis result or the long-term analysis result or any combination thereof, the update data generation unit 232 generates update data from the input feature data, and stores the generated update data generation unit 232 in the update data storage unit 224, in association with the user ID.

Also, the update data generation unit 232 may generate any type of update data as long as the update data is data that can be used for authentication processing. For example, the update data generation unit 232 may output the input feature data as the update data. Also, for example, when a fingerprint image is transmitted from the client PC 10, the update data generation unit 232 may output the fingerprint image as the update data. Also, for example, when a fingerprint image is transmitted from the client PC 10, the update data generation unit 232 outputs data, which is generated in the process of generating the input feature data from the fingerprint image, as the update data.

When the update data is stored in the update data storage unit 224, the updating unit 233 acquires a combination of the user ID and the update data from the update data storage unit 224. Then, the updating unit 233 generates feature data from the acquired update data so as to be stored in the registration feature data storage unit 221. Then, the updating unit 233 updates the registration feature data of the registration feature data storage unit 221, which is stored in association with the acquired user ID as described above, with the generated feature data.

Also, the updating unit 233 may perform the updating processing whenever the update data generation processing by the update data generation unit 232 is terminated, and may perform the updating processing asynchronously with the update data generation processing by the update data generation unit 232. For example, the updating unit 233 may perform the updating processing in a time zone in which a load of the authentication system 1 is reduced. Also, for example, the updating unit 233 may perform the updating processing whenever processing by the update object selection unit 240 to be described later is terminated.

The update object selection unit 240 selects an update object based on a variety of information stored in the analysis result storage unit 223. The update object selection unit 240 corresponds to the prediction unit 140 illustrated in FIG. 1. As illustrated in FIG. 2, the update object selection unit 240 includes the short-term analysis unit 241 and the long-term analysis unit 242. The short-term analysis unit 241 and the long-term analysis unit 242 perform processing asynchronously with the processing by the authentication unit 231 and the update data generation unit 232. For example, the short-term analysis unit 241 and the long-term analysis unit 242 perform processing in a time zone in which a load of the authentication system 1 is reduced. Also, the short-term analysis unit 241 and the long-term analysis unit 242 may perform processing synchronously with each other, or may perform processing asynchronously with each other. For example, the short-term analysis unit 241 may perform short-term analysis processing at a pace of one time per day, and the long-term analysis unit 242 may perform long-term analysis processing at a pace of one time per month.

The short-term analysis unit 241 determines whether a current authentication rate is decreased, by using latest history information stored in the authentication history storage unit 222. Specifically, the short-term analysis unit 241 acquires a short-term authentication result from the authentication history storage unit 222 with respect to each user ID. The term "short-term" as stated herein represents, for example, several days or tens of days. In other words, the short-term analysis unit 241 acquires an authentication result, in which date and time, for example, from several days ago or a dozen or so days ago to the present time, are stored, from the authentication history storage unit 222. Then, the short-term analysis unit 241 calculates an authentication rate by dividing the number of the acquired authentication results having "OK" by the number of the acquired records.

Then, the short-term analysis unit 241 acquires a short-term analysis result, which corresponds to a user ID of a processing object, from the analysis result storage unit 223. Then, when the acquired short-term analysis result is "0 (non-update object)", the short-term analysis unit 241 determines whether or not the calculated authentication rate described above is lower than a threshold value α. When the authentication rate is lower than the threshold value α, the short-term analysis unit 241 updates the short-term analysis result of the analysis result storage unit 223, which corresponds to the user ID of the processing object, from "0" to "1".

The reason for performing the updating as described above is because when the latest authentication rate is lower than a predetermined value (threshold value α), a difference occurs between the registration feature data stored in the registration feature data storage unit 221 and the input feature data acquired from the current user. In other words, this is because the degree of similarity between registration feature data and the input feature data is low. Therefore, the short-term analysis unit 241 selects a user, whose latest authentication rate is lower than the predetermined value (threshold value α), as the update object.

Also, when the short-term analysis result acquired from the analysis result storage unit 223 is "1 (update object)", the short-term analysis unit 241 determines whether or not the calculated authentication rate described above is equal to or greater than a threshold value β. When the authentication rate is equal to or greater than the threshold value β, the short-term analysis unit 241 updates the short-term analysis result of the analysis result storage unit 223, which corresponds to the user ID of the processing object, from "1" to "0".

The reason for performing the updating as described above is because even though a short-term analysis result of a current status is "1 (update object)", the case in which the latest authentication rate is equal to or greater than the predetermined value (threshold value β) means that the authentication rate is recovered. Therefore, when the authentication rate is recovered, the short-term analysis unit 241 determines that the registration feature data does not need to be updated, and excludes the relevant user from the update object.

The threshold value β may be equal to the threshold value α, or may be greater than the threshold value α. In the case of the threshold value β>the threshold value α, the short-term analysis unit 241 enables the update object to become the non-update object when the authentication rate is sufficiently recovered, and therefore, the authentication rate may be prevented from being decreased again. The short-term analysis unit 241 may prevent the frequent occurrence of the processing of updating the short-term analysis result of the analysis result storage unit 223 from "1" to "0" or the processing of updating the short-term analysis result of the analysis result storage unit 223 from "0" to "1". Therefore, the processing load may be reduced.

In this manner, the short-term analysis unit 241 performs the short-term analysis processing with respect to each user ID stored in the authentication history storage unit 222. The short-term analysis unit 241 determines, with respect to each user, whether or not the current authentication rate is decreased.

Also, the short-term analysis unit 241 may divide the short-term authentication result, which is acquired from the authentication history storage unit 222, in each constant period, and calculate an authentication rate in each divided period. When the number of periods in which the authentication rate is less than the threshold value a is greater than a predetermined value, the short-term analysis unit 241 may determine that the current authentication rate is being decreased. When the number of periods in which the authentication rate is equal to or greater than the threshold value α is greater than a predetermined value, the short-term analysis unit 241 may determine that the current authentication rate is not being decreased.

Also, in the above, provided is an example in which the short-term analysis unit 241 compares the authentication rate with the threshold value a to determine whether or not the current authentication rate is being decreased. However, the short-term analysis unit 241 may determine whether or not the present is a period that is difficult to authenticate, by using the degree of similarity or the input feature data quality value. For example, the short-term analysis unit 241 acquires a short-term degree of similarity from the authentication history storage unit 222. The short-term analysis unit 241 calculates an average value of the acquired degree of similarity and determines whether or not the calculated average value is less than a predetermined threshold value. Also, for example, the short-term analysis unit 241 acquires a short-term input feature data quality value from the authentication history storage unit 222. The short-term analysis unit 241 calculates an average value of the acquired input feature data quality value and determines whether or not the calculated average value is less than a predetermined threshold value.

Also, the short-term analysis unit 241 may determine whether or not the present is difficult to authenticate, by using a variation amount of the degree of similarity or a variation amount of the input feature data quality value. For example, the short-term analysis unit 241 acquires a short-term degree of similarity from the authentication history storage unit 222. The short-term analysis unit 241, for example, divides the acquired degree of similarity into two periods and calculates an average value of the degree of similarity in each period. Then, the short-term analysis unit 241 calculates a variation amount of the two calculated average values. When the calculated variation amount has a minus value and, also, an absolute value of the variation amount is greater than a predetermined threshold value, the short-term analysis unit 241 selects a user of a processing object as an update object. This is because when a decrement in the degree of similarity is great, it may be predicted that a future authentication rate will be decreased. Also, when the variation amount has a plus value and, also, an absolute value of the variation amount is greater than a predetermined threshold value, the short-term analysis unit 241 sets a user of a processing object as a non-update object. This is because when an increment in the degree of similarity is great, it may be predicted that a future authentication rate will be increased.

For example, the short-term analysis unit 241 is assumed to acquire a degree of similarity, in which the date is "2009/09/01" to "2009/09/14", from the authentication history storage unit 222. In this case, the short-term analysis unit 241 calculates an average value of the degree of similarity, in which the date is "2009/09/01" to "2009/09/07", and also calculates an average value of the degree of similarity, in which the date is "2009/09/08" to "2009/09/14". Herein, the short-term analysis unit 241 is assumed to calculate "90" as the average value of the former and calculate "60" as the degree of similarity of the latter. In this case, the short-term analysis unit 241 calculates "−30" as the variation amount of the degree of similarity by subtracting "90" from "60". Since the variation amount has a minus value, the short-term analysis unit 241 selects a user of a processing object as an update object when an absolute value "30" of the variation amount is greater than a predetermined threshold value. Even in the case of using the variation amount of the input feature data quality value, the short-term analysis unit 241 performs the same processing as the above.

Subsequently, the long-term analysis unit 242 will be described. The long-term analysis unit 242 performs long-term analysis processing to predict whether or not a future authentication rate will be decreased, by using the history information stored in the authentication history storage unit 222. Specifically, the long-term analysis unit 242 performs average determination processing to determine whether or not an authentication rate is low on average, and period prediction processing to predict whether or not a future authentication rate will be decreased. In particular, in the period prediction processing, the long-term analysis unit 242 in the second embodiment predicts whether or not the authentication rate will be periodically decreased by a change of season.

Hereinafter, the average determination processing and the period prediction processing by the long-term analysis unit 242 will be described in detail. First, the average determination processing by the long-term analysis unit 242 will be described. In the case of performing the average determination processing, the long-term analysis unit 242 acquires a long-term authentication result from the authentication history storage unit 222 with respect to each user ID. The term "long-term" as stated herein represents, for example, several months or several years. In other words, the long-term analysis unit 242 acquires an authentication result, in which date and time from several months ago or several years ago to the present time are stored, from the authentication history storage unit 222.

The long-term analysis unit 242 calculates an authentication rate by dividing the number of the acquired authentication results having "OK" by the number of the acquired records. When the calculated authentication rate is lower than a predetermined threshold value (for example, threshold value α), the long-term analysis unit 242 updates the long-term analysis result of the analysis result storage unit 223, which corresponds to the user ID of the processing object, with "1".

Figure 5:
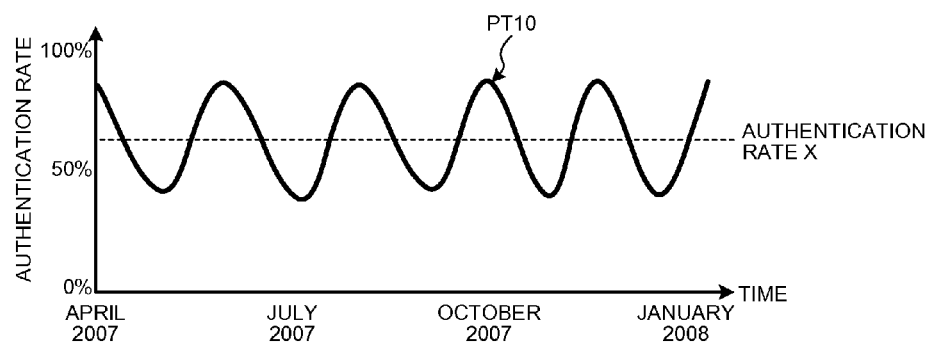
FIG. 5 is a diagram illustrating an example of a transition of an authentication rate.

The reason for performing the updating as described above is because when the authentication rate calculated from the long-term authentication result is lower than the predetermined threshold value, the registration feature data may as well be periodically updated. A description will be made in more detail with reference to FIG. 5. FIG. 5 is a diagram illustrating an example of a transition of an authentication rate. In a graph illustrated in FIG. 5, a vertical axis represents an authentication rate, and a horizontal axis represents time. Also, the authentication rate illustrated in FIG. 5 is assumed to represent a transition of an authentication rate calculated in each predetermined period (for example, several days to tens of days). Also, the authentication rate X is assumed to be a total authentication rate calculated using all authentication results from April of 2007 to January of 2008. Also, the authentication rate X is assumed to be lower than a predetermined threshold value (for example, threshold value α).

In the example illustrated in FIG. 5, for example, since an authentication rate is high at a time point PT10, it may be determined that the registration feature data does not need to be updated. However, when the total authentication rate X is low, it is highly likely that the future authentication rate will be decreased. In other words, as in the example illustrated in FIG. 5, it may be predicted that the authentication rate will be decreased after the time point PT10. Therefore, even if the present is the time point PT10, the long-term analysis unit 242 updates the long-term analysis result of the analysis result storage unit 223 with "1" when the total authentication rate X is lower than a predetermined threshold value.

Subsequently, the period prediction processing by the long-term analysis unit 242 will be described. As described above, the long-term analysis unit 242 extracts a user whose authentication rate is periodically decreased by a change of season. Specifically, the long-term analysis unit 242, first, calculates the authentication rate of the same period of last year by using the authentication result stored in the authentication history storage unit 222. Subsequently, the long-term analysis unit 242 determines whether or not the calculated authentication rate is lower than a predetermined threshold value γ. When the authentication rate in the same period of last year is equal to or greater than the threshold value γ, the long-term analysis unit 242 predicts that it is not considered that the future authentication rate will be necessarily decreased. Then, the long-term analysis unit 242 updates the long-term analysis result of the analysis result storage unit 223, which corresponds to the user ID of the processing object, with "0".

On the other hand, when the authentication rate in the same period of last year is lower than the threshold value γ, the long-term analysis unit 242 determines whether or not a variation in the authentication rate is periodic. Specifically, the long-term analysis unit 242 determines whether or not a temporal variation of the current authentication rate is similar to a temporal variation of the authentication rate of last year. When the temporal variation of the current authentication rate is similar to the temporal variation of the authentication rate of last year, the long-term analysis unit 242 predicts that the future authentication rate will be decreased. Then, the long-term analysis unit 242 updates the long-term analysis result of the analysis result storage unit 223, which corresponds to the user ID of the processing object, with "1". This is because when the temporal variation of the current authentication rate is similar to the temporal variation of the authentication rate of last year, it is considered that the authentication rate varies periodically, and therefore, when the authentication rate in the same period of last year is being decreased, it may be predicted that the future authentication rate will be decreased.

On the other hand, when the temporal variations of both authentication rates are not similar to each other, the long-term analysis unit 242 predicts that it is not considered that the future authentication rate will be necessarily decreased. Then, the long-term analysis unit 242 updates the long-term analysis result of the analysis result storage unit 223, which corresponds to the user ID of the processing object, with "0". This is because when the temporal variation of the current authentication rate is not similar to the temporal variation of the authentication rate of last year, it is considered that the authentication rate does not vary periodically, and therefore, even though the authentication rate in the same period of last year is being decreased, it may not be considered that the current authentication rate will be necessarily decreased.

Figure 6:
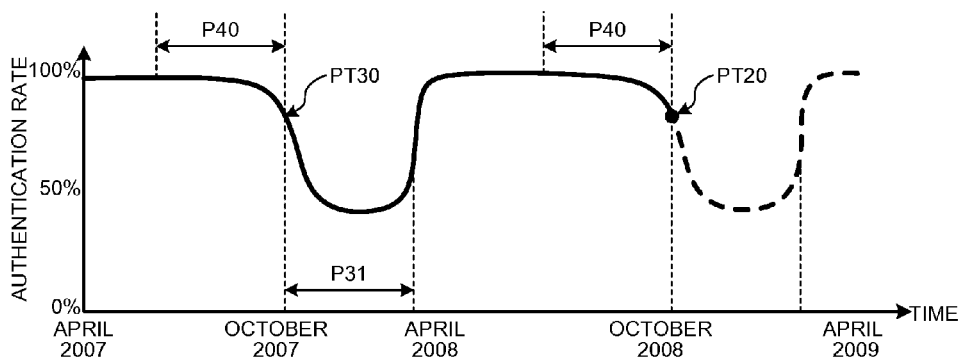
FIG. 6 is a diagram illustrating an example of a transition of an authentication rate.

The period prediction processing by the long-term analysis unit 242 will be described with reference to FIG. 6. FIG. 6 is a diagram illustrating an example of a transition of an authentication rate. As in the example illustrated in FIG. 5, the authentication rate illustrated in FIG. 6 is assumed to represent a transition of an authentication rate calculated in each predetermined period (for example, several days to tens of days). In the example illustrated in FIG. 6, the current time point is assumed to be P120. In other words, the long-term analysis unit 242 is assumed to perform the period prediction processing at the time point P120.

In this case, the long-term analysis unit 242 calculates an authentication rate, for example, from a time point PT30, which is a year ago from the present time PT20, to a predetermined period P31, as the authentication rate of the same period of last year. Subsequently, the long-term analysis unit 242 determines whether or not the calculated authentication rate is lower than a predetermined threshold value γ. Herein, the long-term analysis unit 242 determines that the authentication rate in the same period of last year is lower than the threshold value γ. In this case, the long-term analysis unit 242 calculates a temporal variation of the authentication rate, for example, from a past time point, which is a predetermined period P40 ago from the present, to the current time point P120. Also, the long-term analysis unit 242 calculates a temporal variation of the authentication rate from a past time point, which is the predetermined period P40 ago from the time point PT30 a year ago, to the time point P130. Then, the long-term analysis unit 242 calculates a degree of similarity in the temporal variations of both authentication rates. Also, the long-term analysis unit 242 calculates a degree of similarity using a correlation function or a distance between the temporal variations of both authentication rates.

The long-term analysis unit 242 predicts that the future authentication rate will be decreased when the calculated degree of similarity is higher than a predetermined threshold value, and predicts that it is not considered that the future authentication rate will be necessarily decreased when the calculated degree of similarity is the predetermined threshold value or less. In this way, in the period prediction processing, the long-term analysis unit 242, as illustrated in FIG. 6, may select the user, whose authentication rate is decreased during the winter, as the update object before the authentication rate is decreased.

Also, when history information of more than two years ago is stored in the authentication history storage unit 222, the long-term analysis unit 242 may perform the period prediction processing by using an authentication rate in the same period of two years ago or an authentication rate in the same period of three years ago, as well as an authentication rate in the same period of last year. Also, when the authentication rate in the same period of last year is lower than the threshold value γ, the long-term analysis unit 242 may predict that the future authentication rate will be decreased, without determining whether or not a variation in the authentication rate is periodic.

In this way, the long-term analysis unit 242 performs the average determination processing and the period prediction processing with respect to each user ID stored in the authentication history storage unit 222. Also, the long-term analysis unit 242 may not perform both of the average determination processing and the period prediction processing. For example, the long-term analysis unit 242 may first perform the average determination processing, but may not perform the period prediction processing when it is determined in the average determination processing that the user is the update object, and may perform the period prediction processing when it is determined in the average determination processing that the user is not the update object. Also, for example, the long-term analysis unit 242 may first perform the period prediction processing, but may not perform the average determination processing when it is determined in the period prediction processing that the user is the update object, and may perform the average determination processing when it is determined in the period prediction processing that the user is not the update object.

Also, when it is determined by the long-term analysis unit 242 that the user is the update object, the short-term analysis unit 241 according to the second embodiment may not perform the short-term analysis processing. This is because when it is determined by the long-term analysis unit 242 that the user is the update object, registration feature data stored in the registration feature data storage unit 221 is updated with update data.

Also, an example in which the long-term analysis unit 242 performs the average determination processing and the period prediction processing by using the authentication rate has been described above. However, the long-term analysis unit 242 may perform the average determination processing and the period prediction processing by using a degree of similarity, an input feature data quality value, a variation amount of the degree of similarity, a variation amount of the input feature data quality value, and the like.

Also, the short-term analysis unit 241 may change the threshold value α or the threshold value β according to the result of the long-term analysis processing by the long-term analysis unit 242. For example, when performing the short-term analysis processing with respect to a user selected as an update object by the long-term analysis unit 242, the short-term analysis unit 241 may increase the threshold value α and the threshold value β. This is because it is highly likely that a future authentication rate of a user selected as an update object by the long-term analysis unit 242 will be decreased. In other words, the short-term analysis unit 241 increases the threshold value α to make it easy for the user to be selected as the update object. Also, with respect to the user selected as the update object by the long-term analysis unit 242, the short-term analysis unit 241 increases the threshold value β to make it difficult for the user to be excluded from the update object.

Also, the above-described authentication unit 231 of FIG. 2, for example, is an integrated circuit, such as an ASIC (application specific integrated circuit), an FPGA (field programmable gate array), or the like, or an electronic circuit, such as a CPU (central processing unit) or the like. Likewise, the update data generation unit 232, the updating unit 233, and the update object selection unit 240, for example, are integration circuits or electronic circuits.

Authentication Processing Procedure

Figure 7:
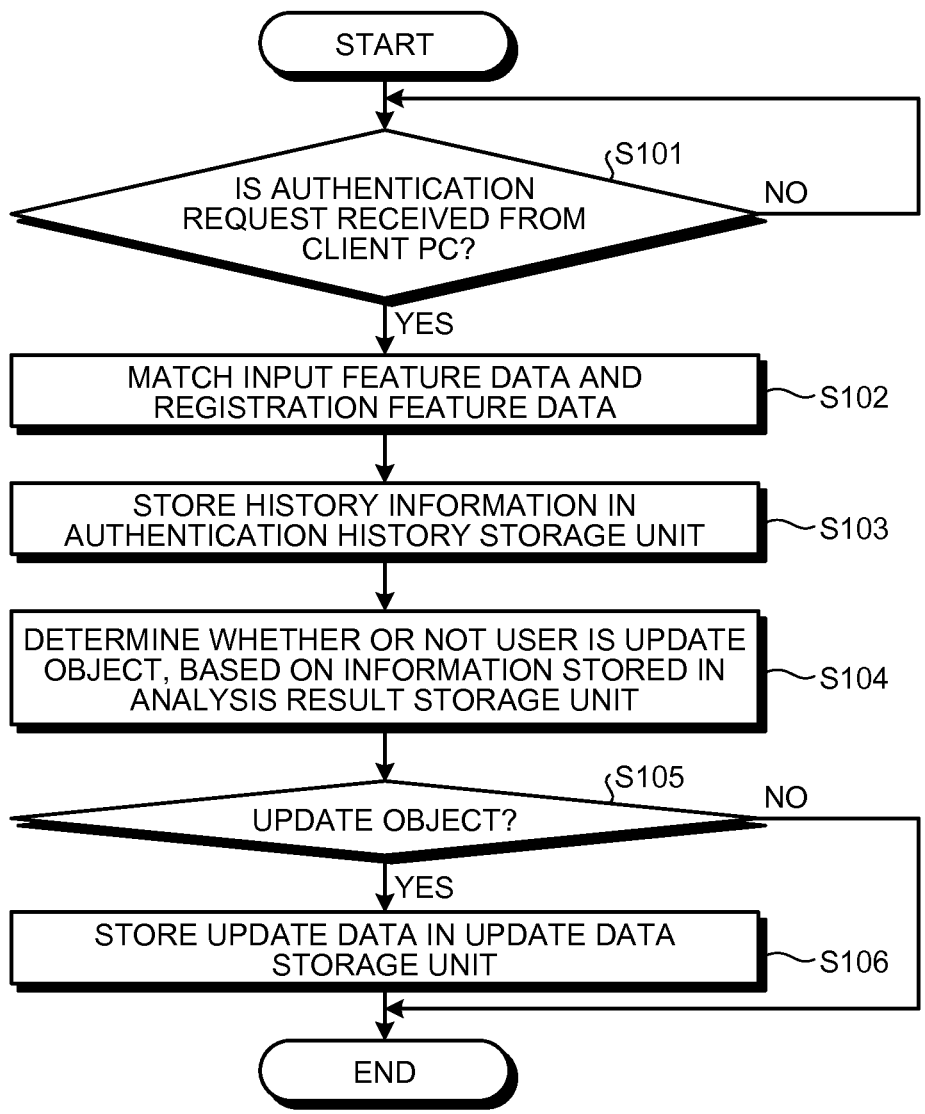
FIG. 7 is a flowchart illustrating an authentication processing procedure by the authentication system according to the second embodiment.

Next, the authentication processing procedure by the authentication system 1 according to the second embodiment will be described with reference to FIG. 7. FIG. 7 is a flowchart illustrating the authentication processing procedure by the authentication system 1 according to the second embodiment.

As illustrated in FIG. 7, when the authentication unit 231 of the authentication server 200 receives an authentication request from the client PC 10 (YES in step S101), the authentication unit 231 matches input feature data and registration feature data stored in the registration feature data storage unit 221 (step S102). The authentication unit 231 stores history information, such as date and time on which the authentication processing is performed, an authentication result, a calculated degree of similarity, and a quality value, in the authentication history storage unit 222 (step S103).

Subsequently, the update data generation unit 232 determines whether or not a user represented by a user ID included in the authentication request is an update object, based on a variety of information stored in the analysis result storage unit 223 (step S104). Specifically, the update data generation unit 232 determines that the user is the update object when "1" is stored in a short-term analysis result and a long-term analysis result stored in the analysis result storage unit 223.

The update data generation unit 232 ends processing when the user of the processing object is not the update object (NO in step S105). On the other hand, when the user to be processed is the update object (YES in step S105), the update data generation unit 232 generates update data from the input feature data and stores the generated update data in the update data storage unit 224 (step S106).

Short-term Analysis Processing Procedure

Figure 8:
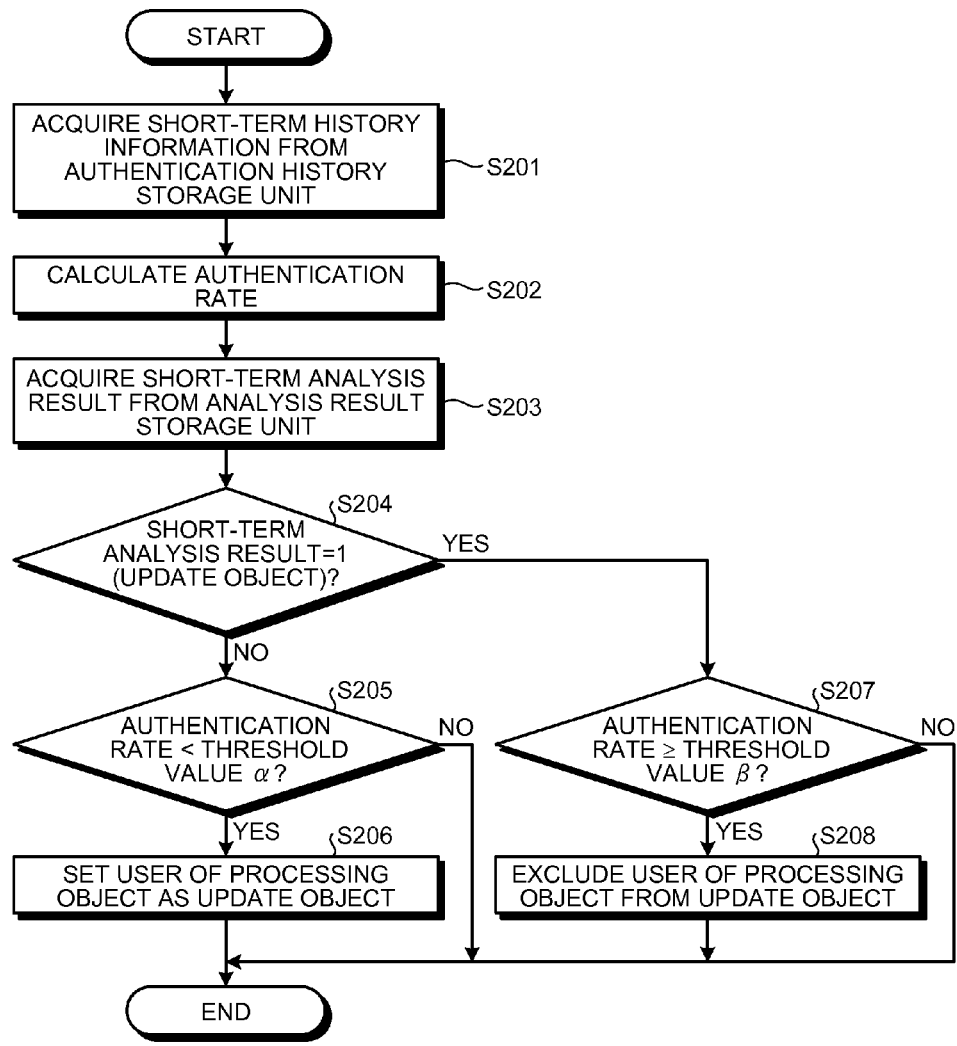
FIG. 8 is a flowchart illustrating a short-term analysis processing procedure by a short-term analysis unit in the second embodiment.

Next, the short-term analysis processing procedure by the short-term analysis unit 241 in the second embodiment will be described with reference to FIG. 8. FIG. 8 is a flowchart illustrating the short-term analysis processing procedure by the short-term analysis unit 241 in the second embodiment. Also, the short-term analysis unit 241 performs the processing procedure illustrated in FIG. 8 with respect to each user ID stored in the authentication history storage unit 222.

As illustrated in FIG. 8, the short-term analysis unit 241 acquires an authentication result of a short term, for example, from several days ago or a dozen or so days ago to the present time, from the authentication history storage unit 222 with respect to each user ID (step S201). The short-term analysis unit 241 calculates an authentication rate using the acquired authentication result (step S202). Subsequently, the short-term analysis unit 241 acquires a short-term analysis result, which corresponds to the user ID of the processing object, from the analysis result storage unit 223 (step S203).

When the acquired short-term analysis result is "0" (non-update object) (NO in step S204), the short-term analysis unit 241 determines whether or not the authentication rate calculated in step S202 is lower than a threshold value α (step S205). When the authentication rate is lower than the threshold value α (YES in step S205), the short-term analysis unit 241 sets the user, who is represented by the user ID of the processing object (hereinafter, simply referred to as "user of processing object"), as the update object (step S206). Specifically, the short-term analysis unit 241 updates the short-term analysis result of the analysis result storage unit 223, which corresponds to the user ID of the processing object, from "0" to "1". On the other hand, the short-term analysis unit 241 ends processing when the authentication rate is the threshold value a or more (NO in step S205).

Also, when the short-term analysis result acquired from the analysis result storage unit 223 is "1" (update object) (YES in step S204), the short-term analysis unit 241 determines whether or not the authentication rate calculated in step S202 is a threshold value β or more (step S207). When the authentication rate is the threshold value β or more (YES in step S207), the short-term analysis unit 241 excludes the user of the processing object from the update object (step S208). Specifically, the short-term analysis unit 241 updates the short-term analysis result of the analysis result storage unit 223, which corresponds to the user ID of the processing object, from "1" to "0". On the other hand, the short-term analysis unit 241 ends processing when the authentication rate is less than the threshold value β (NO in step S207).

Long-Term Analysis Processing Procedure

Figure 9:
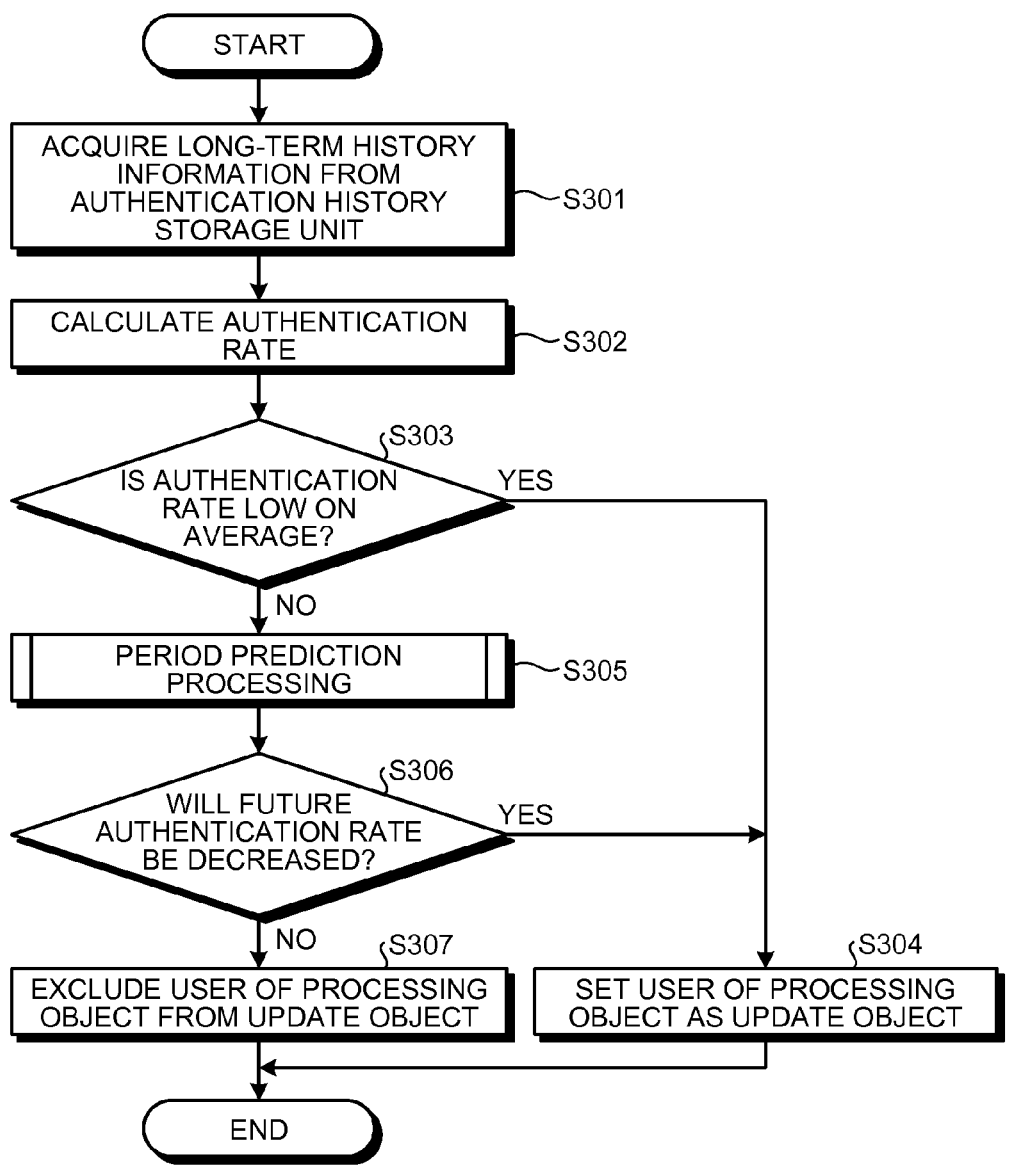
FIG. 9 is a flowchart illustrating a long-term analysis processing procedure by a long-term analysis unit in the second embodiment.

Next, the long-term analysis processing procedure by the long-term analysis unit 242 in the second embodiment will be described with reference to FIG. 9. FIG. 9 is a flowchart illustrating the long-term analysis processing procedure by the long-term analysis unit 242 in the second embodiment. Also, the long-term analysis unit 242 performs the processing procedure illustrated in FIG. 9 with respect to each user ID stored in the authentication history storage unit 222. Also, FIG. 9 illustrates an example in which the long-term analysis unit 242 does not perform the period prediction processing when it is determined in the average determination processing that the user is the update object, and performs the period prediction processing when it is determined in the average determination processing that the user is not the update object.

As illustrated in FIG. 9, the long-term analysis unit 242 acquires an authentication result of a long term, for example, from several months ago or several years ago to the present time, from the authentication history storage unit 222 with respect to each user ID (step S301). The long-term analysis unit 242 calculates an authentication rate using the acquired authentication result (step S302). Then, the long-term analysis unit 242 compares the calculated authentication rate with a predetermined threshold value and determines whether or not the authentication rate of the user of the processing object is low on average (step S303).

When the authentication rate is low on average (YES in step S303), the long-term analysis unit 242 sets the user of the processing object as the update object (step S304). Specifically, the long-term analysis unit 242 updates the long-term analysis result of the analysis result storage unit 223, which corresponds to the user ID of the processing object, with "1".

Also, when the authentication rate is not low on average (NO in step S303), the long-term analysis unit 242 performs the period prediction processing (step S305). As the result of the period prediction processing, when it is predicted that a future authentication rate will be decreased (YES in step S306), the long-term analysis unit 242 sets the user of the processing object as the update object (step S304). On the other hand, when it is predicted that it is not considered that the future authentication rate will be necessarily decreased (NO in step S306), the long-term analysis unit 242 excludes the user of the processing object from the update object (step S307). Specifically, the long-term analysis unit 242 updates the long-term analysis result of the analysis result storage unit 223, which corresponds to the user ID of the processing object, with "0".

Period Prediction Procedure

Figure 10:
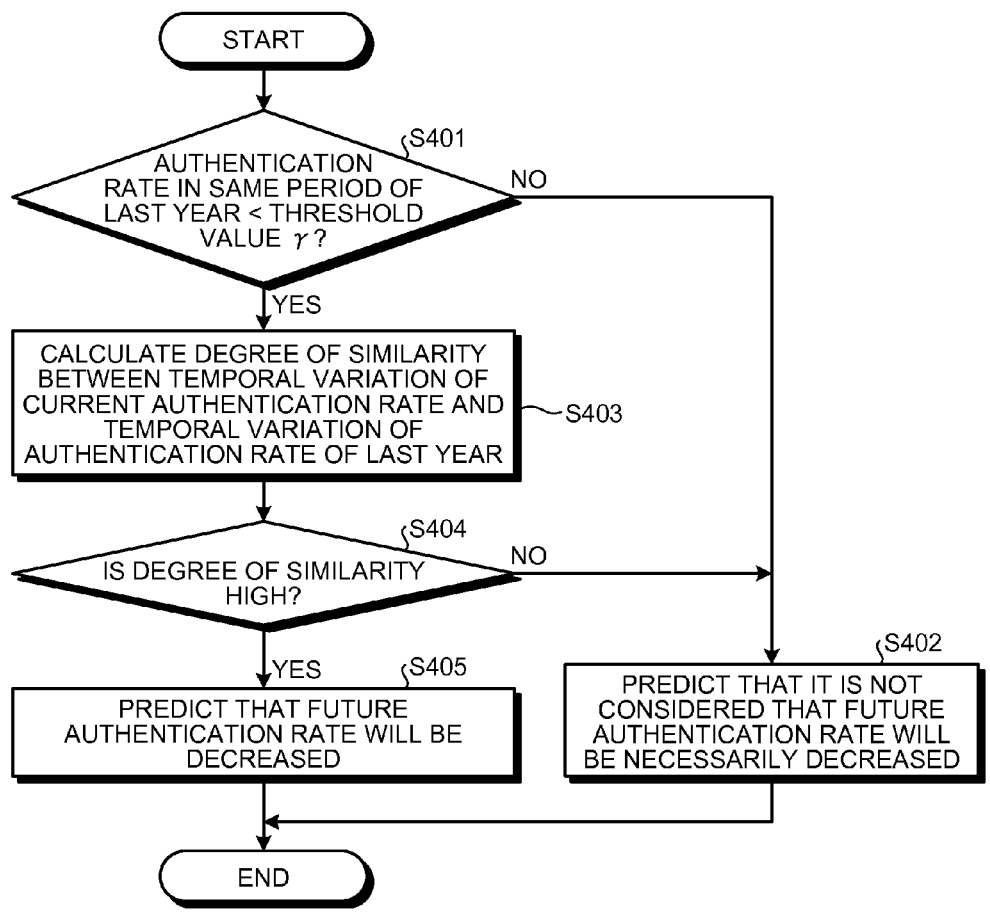
FIG. 10 is a flowchart illustrating a period prediction procedure by the long-term analysis unit in the second embodiment.

Next, the period prediction procedure by the long-term analysis unit 242 in the second embodiment will be described with reference to FIG. 10. FIG. 10 is a flowchart illustrating the period prediction procedure by the long-term analysis unit 242 in the second embodiment.

As illustrated in FIG. 10, the long-term analysis unit 242 calculates an authentication rate of the same period of last year by using the authentication result stored in the authentication history storage unit 222, and determines whether or not the calculated authentication rate is lower than a predetermined threshold value γ (step S401). When the authentication rate in the same period of last year is the threshold value γ or more (NO in step S401), the long-term analysis unit 242 predicts that it is not considered that the future authentication rate will be necessarily decreased (step S402).

On the other hand, when the authentication rate in the same period of last year is lower than the threshold value γ (YES in step S401), the long-term analysis unit 242 calculates a degree of similarity between a temporal variation of a current authentication rate and a temporal variation of an authentication rate of last year (step S403). When the calculated degree of similarity is higher than a predetermined value (YES in step S404), the long-term analysis unit 242 predicts that the future authentication rate will be decreased (step S405). On the other hand, when the calculated degree of similarity is lower than the predetermined value (NO in step S404), the long-term analysis unit 242 predicts that it is not considered that the future authentication rate will be necessarily decreased (step S402).

Effects of Second Embodiment

As described above, the authentication system 1 according to the second embodiment selects the update object through the short-term analysis processing by the short-term analysis unit 241 and the long-term analysis processing by the long-term analysis unit 242. Since the authentication system 1 according to the second embodiment may appropriately select the update object, the authentication system 1 may increase an authentication rate while suppressing an increase in a processing load.

Herein, cases in which the authentication rate is decreased will be described with several examples. A case in which the authentication system 1 according to the second embodiment is used by users corresponding to these cases will be described. First, as in the example illustrated in FIG. 5, there is a case in which an authentication rate is frequently decreased. It is thought that this case happens because a condition of a user's skin surface is easily changed, and thus, a fingerprint image acquired by a fingerprint sensor is changed. Even though the authentication system 1 according to the second embodiment is used by a user whose authentication rate is frequently decreased, the authentication system 1 predicts that the authentication rate will be decreased immediately, and always selects this user as the update object. For this reason, the authentication system 1 may also increase the authentication rate of the user whose authentication rate is frequently decreased.

Also, as in the example illustrated in FIG. 6, there is a case in which an authentication rate is periodically decreased. This case may happen to, for example, a user whose palm becomes dry in winter season. When the authentication system 1 according to the second embodiment is used by a user whose authentication rate is periodically decreased, the authentication system 1 predicts that the future authentication rate is being decreased and may select this user as the update object. In other words, since the authentication system 1 may select the user as the update object before the authentication rate is decreased, the authentication rate may be increased.

Figure 11:
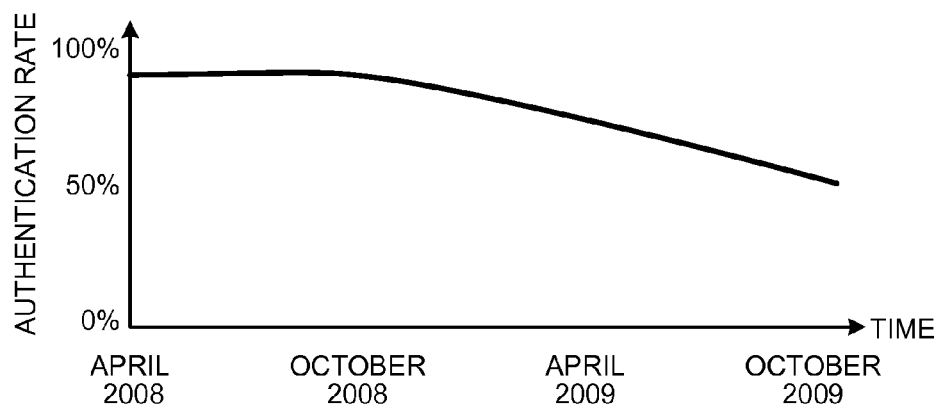
FIG. 11 is a diagram illustrating an example of a transition of an authentication rate.
Figure 12:
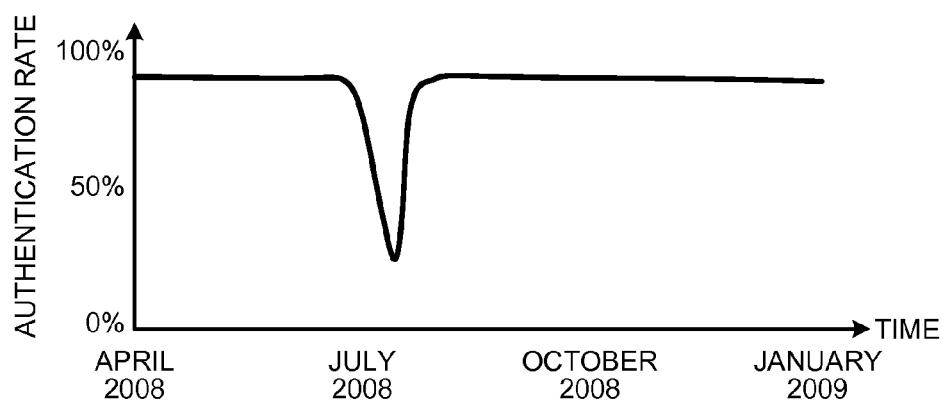
FIG. 12 is a diagram illustrating an example of a transition of an authentication rate.
Figure 13:
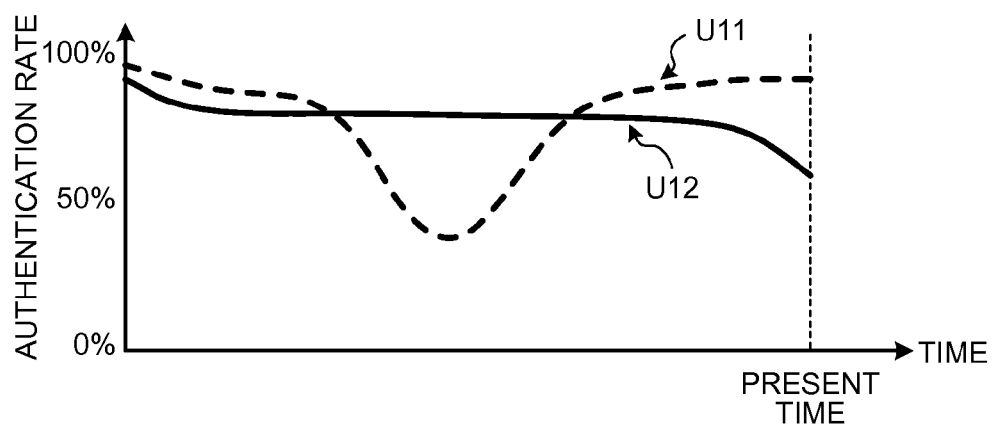
FIG. 13 is a diagram illustrating an example of a transition of an authentication rate.

Also, other cases will be described with reference to FIGS. 11 to 13. FIGS. 11 to 13 are diagrams illustrating examples of a transition of an authentication rate. In the example illustrated in FIG. 11, the authentication rate is gradually decreased. This case may happen when a user grows up or when a user's constitution is changed. Even though the authentication system 1 according to the second embodiment is used by a user whose authentication rate is gradually decreased, the authentication system 1 may select this user as the update object when the authentication rate becomes lower than the threshold value α.

Also, in the example illustrated in FIG. 12, the authentication rate is temporarily decreased. This case may happen when a user's finger has been hurt. As described above, in the authentication system 1 according to the second embodiment, the short-term analysis unit 241 determines whether or not a current authentication rate is being decreased. Therefore, even though the authentication system 1 is used by a user whose authentication rate is temporarily decreased, the authentication system 1 may select this user as the update object.

As described above, since the authentication system 1 according to the second embodiment selects the update object by performing both of the short-term analysis processing and the long-term analysis processing, the authentication system 1 may cope with a plurality of cases in which an authentication rate is decreased. For example, in the example illustrated in FIG. 13, an authentication rate of a user U11 is temporarily decreased, but an authentication rate at present time is high. On the other hand, an authentication rate of a user U12 is high on average, but an authentication rate at present time is low. In the example illustrated in FIG. 13, if only the average determination processing is performed by the long-term analysis unit 242, the user U12 is not selected as the update object because the authentication rate of the user U12 is high on average. However, essentially, it is preferable that the user U12 be selected as the update object because the authentication rate in the current status is low. Due to the short-term analysis processing by the short-term analysis unit 241, the authentication system 1 according to the second embodiment may select the user U12 illustrated in FIG. 13 as the update object. Also, due to the average determination processing or the period prediction processing by the long-term analysis unit 242, the authentication system 1 may select the user U11 illustrated in FIG. 13 as the update object.

[c] Third Embodiment

In the second embodiment, when the user is selected as the update object by the update object selection unit 240, the update data generation unit 232 generates update data of the update object. However, when the update object is selected, the authentication system disclosed in this application may set priority and generate update data in descending order of priority. In the third embodiment, an example that sets priority to the update object will be described.

Configuration of Authentication System According to Third Embodiment

Figure 14:
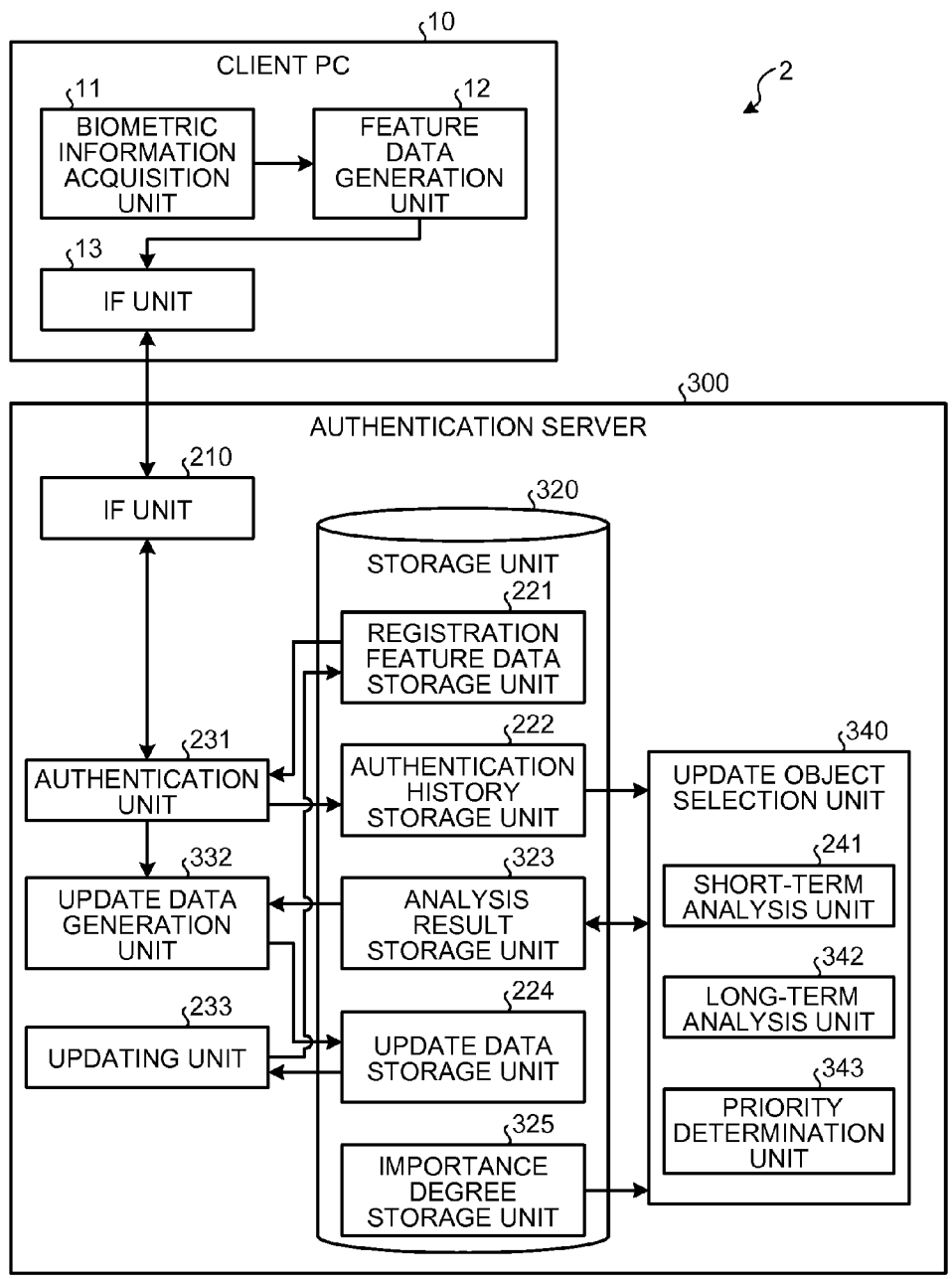
FIG. 14 is a diagram illustrating an example of a configuration of an authentication system according to a third embodiment.

First, a configuration of an authentication system according to a third embodiment will be described with reference to FIG. 14. FIG. 14 is a diagram illustrating an example of the configuration of the authentication system according to the third embodiment. Also, in the following, the same reference numerals will be assigned to components having the same function as the already illustrated components, and detailed description thereof will not be repeated.

As illustrated in FIG. 14, an authentication system 2 according to the third embodiment includes an authentication server 300. The authentication server 300 includes a storage unit 320, an update data generation unit 332, an update object selection unit 340, and the like. A storage unit 320 includes an analysis result storage unit 323, an importance degree storage unit 325, and the like.

The analysis result storage unit 323 stores results of analysis processing performed by a short-term analysis unit 241 and a long-term analysis unit 342 to be described later. FIG. 15 is a diagram illustrating an example of the analysis result storage unit 323 in the third embodiment. In the example illustrated in FIG. 15, the analysis result storage unit 323 includes items, such as "user ID", "short-term analysis result", "long-term analysis result", and "priority". The "user ID" and the "short-term analysis result" are the same as the "user ID" and the "short-term analysis result" of the analysis result storage unit 223 illustrated in FIG. 4.

The "long-term analysis result" stores the result of the analysis processing performed by the long-term analysis unit 342, with being divided into "periodic" and "average". The "periodic" of the "long-term analysis result" is information updated during period prediction processing by the long-term analysis unit 342. The "average" of the "long-term analysis result" is information that is updated during average determination processing by the long-term analysis unit 342.

The "priority" is information that is updated by a priority determination unit 343 to be described above, and is an order in which update data is generated by the update data generation unit 332. Also, in FIG. 15, it is assumed that priority is higher as a numerical value stored in "priority" is smaller. In other words, in the example illustrated in FIG. 15, a priority of a user having a user ID of "U011" is highest.

The importance degree storage unit 325 stores the degree of importance of the analysis processing by the short-term analysis unit 241 and the long-term analysis unit 342. FIG. 16 is a diagram illustrating an example of the importance degree storage unit 325 in the third embodiment. In the example illustrated in FIG. 16, the importance degree storage unit 325 includes items, such as "analysis method" and "degree of importance". The "analysis method" is information that specifies the analysis processing by the short-term analysis unit 241 and the long-term analysis unit 342. In the example illustrated in FIG. 16, "short-term analysis" stored in the "analysis method" represents the short-term analysis processing by the short-term analysis unit 241. Also, "long-term analysis (periodic)" represents the period prediction processing by the long-term analysis unit 342, and "long-term analysis (average)" represents the average determination processing by the long-term analysis unit 342.

The "degree of importance" is the degree of importance of the relevant analysis method. The importance degree storage unit 325 illustrated in FIG. 16 illustrates that the degree of importance of the "short-term analysis" is the highest, the degree of importance of the "long-term analysis (periodic)" is the second highest, and the degree of importance of the "long-term analysis (average)" is the third highest.

Returning to the description of FIG. 14, the update object selection unit 340 corresponds to the prediction unit 140 illustrated in FIG. 1 and includes the short-term analysis unit 241, the long-term analysis unit 342, and the priority determination unit 343. The long-term analysis unit 342 performs both of the period prediction processing and the average determination processing described in the second embodiment. In the case of performing the period prediction processing, the long-term analysis unit 342 stores the processing result in "periodic" of the "long-term analysis result" of the analysis result storage unit 323. Also, in the case of performing the average determination processing, the long-term analysis unit 342 stores the processing result in "average" of the "long-term analysis result" of the analysis result storage unit 323.

The priority determination unit 343 updates the priority of the analysis result storage unit 323, based on the information stored in the importance degree storage unit 325. Specifically, the priority determination unit 343, first, acquires the degree of importance of the analysis processing by the short-term analysis unit 241 and the long-term analysis unit 342 from the importance degree storage unit 325. The priority determination unit 343 updates the priority of the analysis result storage unit 323, based on the acquired degree of importance.

For example, the analysis result storage unit 323 is assumed to be in a state illustrated in FIG. 15, and the importance degree storage unit 325 is assumed to be in a state illustrated in FIG. 16. In this case, the priority determination unit 343 determines that the degree of importance of a record, in which "1" is stored in all of the "short-term analysis result", the "long-term analysis result (periodic)", and the "long-term analysis result (average)", is the highest among the records stored in the analysis result storage unit 323. Subsequently, the priority determination unit 343 determines that the degree of importance of a record, in which "1" is stored in the "short-term analysis result" and the "long-term analysis result (periodic)", is the second highest. Subsequently, the priority determination unit 343 determines that the degree of importance of a record, in which "1" is stored in all of the "short-term analysis result" and the "long-term analysis result (average)", is the third highest. In this way, the priority determination unit 343 updates the degree of importance of the analysis result storage unit 323 with the determined degree of importance.

Also, in the case of the same priority, the priority determination unit 343 acquires the authentication rate, the degree of similarity, or the input feature data quality value, which is stored in the authentication history storage unit 222, and may set the priority to be higher to a user whose authentication rate or the like is lower.

In the update data generation unit 332, an upper limit to generate update data per unit time has been determined. In the case of generating the update data, the update data generation unit 332 determines whether or not the number of the update objects per unit time reaches the upper limit. When the number of the update objects reaches the upper limit, the update data generation unit 332 generates the update data while giving priority to the high-priority user stored in the analysis result storage unit 323.

Effects of Third Embodiment

As described above, the authentication system 2 according to the third embodiment sets priority to the update object and performs update data generation processing while giving priority to the number of high-priority update objects in the case that the number of the update objects reaches the upper limit. This enables the authentication system 2 according to the third embodiment to regulate the increase in the processing load.

Also, the update data generation unit 332 may perform the processing by the priority determination unit 343. Specifically, in the case of generating the update data, the priority of the analysis result storage unit 323 is updated based on the information stored in the importance degree storage unit 325. The update data generation unit 332 determines whether or not the number of the update objects per unit time reaches the upper limit. When the number of the update objects reaches the upper limit, the update data generation unit 332 generates the update data while giving priority to the high-priority user.

[d] Fourth Embodiment

Meanwhile, the authentication device, the authentication system, and the authentication method disclosed in this application may be embodied in various other types, in addition to the above-described embodiments. Therefore, in the fourth embodiment, other embodiments of the authentication device of the like disclosed in this application will be described.

Biometric Information

Although the example of using the fingerprint as biometric information has been described in the above embodiments, the authentication device, the authentication system, and the authentication server disclosed in this application may also be applied to a system that performs authentication using biometric information other than the fingerprint. For example, it may be considered that an authentication rate of a palm print is periodically changed by a change of season or the like, as with the fingerprint. Also, for example, it is known that a thickness of a blood vessel is changed by a temperature change accompanying a change of season. In other words, it may be considered that an authentication rate of a vein is periodically changed by a change of season or the like, as with the fingerprint. Therefore, the authentication device or the like disclosed in this application may also be applied to a system that employs, for example, a palm print authentication or a vein authentication.

Client

Also, in the above embodiments, as in the example illustrated in FIG. 2, an example of the authentication system including the client PC and the authentication server has been illustrated. However, the configuration of the authentication system disclosed in this application is not limited to this. For example, the authentication system 1 illustrated in FIG. 2 may include a fingerprint sensor or the like provided at an entrance of a building or the like, instead of the client PC 10.

History of Long-Term Analysis Processing

Also, when it is determined that the authentication rate is low on average, or when it is predicted that the authentication rate will be periodically decreased, the long-term analysis unit 242 or 342 described in the second and third embodiments may retain such information. Hereinafter, detailed description will be made with reference to FIG. 17. FIG. 17 is a diagram illustrating an example of a reduction cause storage unit 326. Also, hereinafter, processing by the long-term analysis unit 242 will be described with an example.

In the example illustrated in FIG. 17, the reduction cause storage unit 326 includes items, such as "user ID", "period", and "cause". When it is determined by the average determination processing that the authentication rate is low on average, the long-term analysis unit 242 stores year and month in which the average determination processing was performed, in "period" of the reduction cause storage unit 326, and also stores information, which represents that the authentication rate is low on average, in "cause". In the example illustrated in FIG. 17, when it is determined by the average determination processing that the authentication rate is low on average, the reduction cause storage unit 326 stores information such as "average" in "cause" of the reduction cause storage unit 326. Also, when it is predicted by the period prediction processing that the present time is a period difficult to authenticate, the long-term analysis unit 242 stores year and month in which the average determination processing was performed, in "period" of the reduction cause storage unit 326, and also stores information, such as "periodic", in "cause".

When "periodic" is stored in "cause" of the reduction cause storage unit 326 corresponding to the same period of last year, the long-term analysis unit 242 may predict that the authentication rate will be periodically decreased, without performing the period prediction processing. Also, when "periodic" is stored more than a predetermined frequency in "cause" of the reduction cause storage unit 326, the long-term analysis unit 242 may predict that the authentication rate is low on average, without performing the average determination processing. For example, the reduction cause storage unit 326 is assumed to be in a state illustrated in FIG. 17. In this case, it is predicted that an authentication rate of a user whose user ID is "U011" will be periodically decreased in January of 2007 and January of 2008. That is, it is thought that the authentication rate of this user will be decreased in January of every year. In this case, in January of every year, the long-term analysis unit 242 may predict that the authentication rate will be periodically decreased, without performing the period prediction processing with respect to the user ID "U011". Also, with respect to a user for which information such as "average" is stored every month, the long-term analysis unit 242 may predict that the authentication rate is low on average, without performing the average determination processing. Therefore, the long-term analysis unit 242 may reduce a load that is imposed on the long-term analysis processing. Also, in FIG. 17, although an example in which a monthly period is stored in "period" of the reduction cause storage unit 326 is illustrated, the long-term analysis unit 242 may store a period based on, for example, 1 week, 2 weeks, 2 months, or 3 months, in "period" of the reduction cause storage unit 326.

Program

Also, a variety of processing described in the above embodiments may be realized by executing a previously prepared program on a computer such as a personal computer or a workstation. Therefore, hereinafter, an example of a computer executing an authentication program having the same function as the authentication device 100 illustrated in FIG. 1 will be described with reference to FIG. 18.

Figure 18:
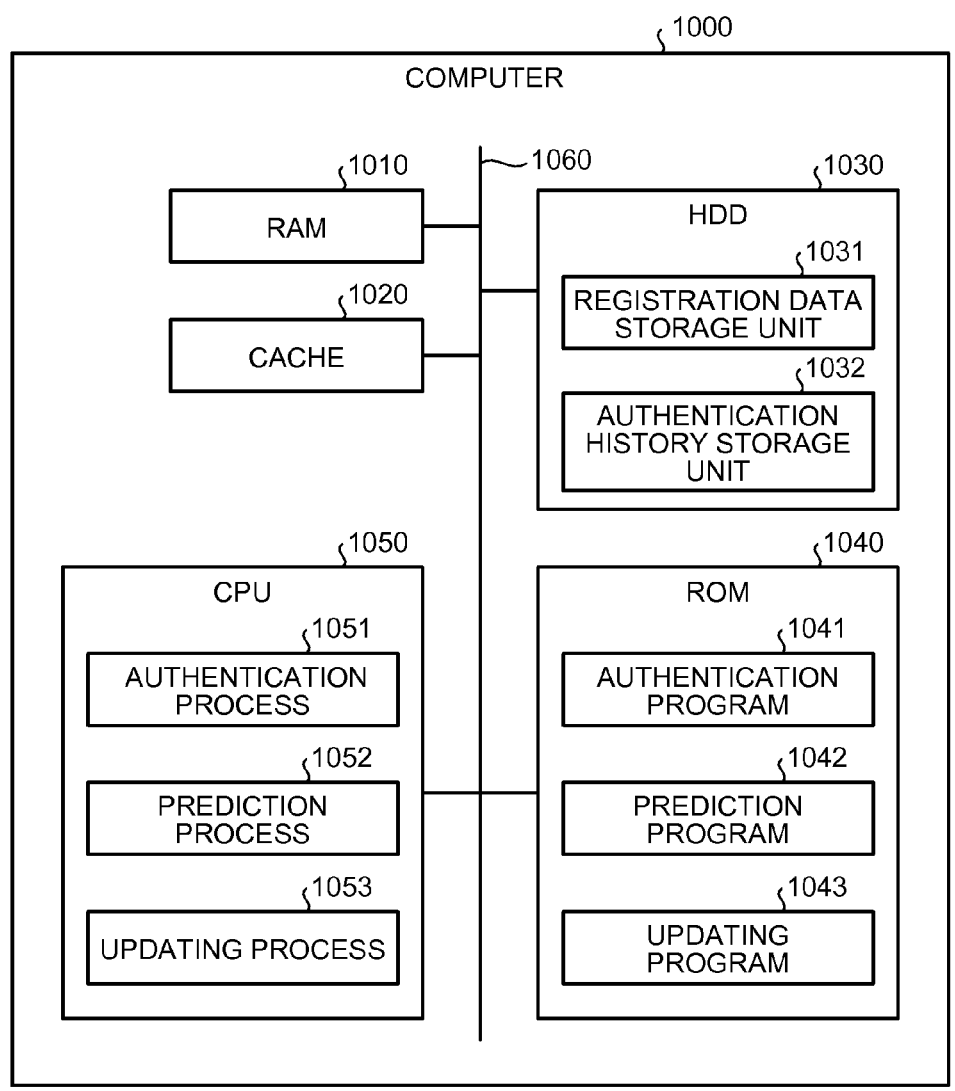
FIG. 18 is a diagram illustrating a computer that executes an authentication program.

FIG. 18 is a diagram illustrating a computer that executes an authentication program. As illustrated in FIG. 18, a computer 1000 includes a RAM (random access memory) 1010, a cache 1020, an HDD 1030, a ROM (read only memory) 1040, a CPU 1050, and a bus 1060. The RAM 1010, the cache 1020, the HDD 1030, the ROM 1040, and the CPU 1050 are connected by the bus 1060.

The ROM 1040 prestores an authentication program that fulfills the same function as the authentication device 100 illustrated in FIG. 1. Specifically, the ROM 1040 stores an authentication program 1041, a prediction program 1042, and an updating program 1043.

The CPU 1050 reads and executes these authentication programs 1041, the prediction program 1042, and the updating program 1043. Accordingly, as illustrated in FIG. 18, the authentication program 1041 becomes an authentication process 1051, the prediction program 1042 becomes a prediction process 1052, and the updating program 1043 becomes an updating process 1053. Also, the authentication process 1051 corresponds to the authentication unit 120 illustrated in FIG. 1, the prediction process 1052 corresponds to the prediction unit 140 illustrated in FIG. 1, and the updating process 1053 corresponds to the updating unit 150 illustrated in FIG. 1.

Also, the HDD 1030, as illustrated in FIG. 18, includes a registration data storage unit 1031 and an authentication history storage unit 1032. The registration data storage unit 1031 corresponds to the registration data storage unit 110 illustrated in FIG. 1. Also, the authentication history storage unit 1032 corresponds to the authentication history storage unit 130 illustrated in FIG. 1.

Also, the respective programs 1041 to 1043 may not be necessarily stored in the ROM 1040. For example, the programs 1041 to 1043 may be stored in a "transportable physical medium", such as a flexible disk (FD), a CD-ROM, an MO disk, a DVD disk, a magnetic optical disk, or an IC card, which is inserted into the computer 1000. Alternatively, the programs 1041 to 1043 may be stored in a "fixed physical medium", such as a hard disk drive (HDD) provided inside or outside the computer 1000. Alternatively, the programs 1041 to 1043 may be stored in "other computer (or server)" connected to the computer 1000 through a public line, the Internet, a LAN, a WAN, or the like. The computer 1000 may read the respective programs from the above-described flexible disk or the like and execute the programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

According to an aspect of an authentication device disclosed in the present application, an authentication rate may be increased while an increase in a processing load is suppressed.

What is claimed is:

1. An authentication device comprising:
    a registration data storage unit that stores biometric information of a user as registration data;
    an authentication unit that performs authentication processing by matching input data, which is biometric information input by the user, and registration data, which is stored in the registration data storage unit;
    an authentication history storage unit that stores an authentication result authenticated by the authentication unit as history information;
    a prediction unit that acquires a periodic temporal variation of an authentication rate, which succeeds in authentication, using the history information stored in the authentication history storage unit, and predicts whether or not a future authentication rate is lower than a first threshold value, from an authentication rate after a previous time point by a period included in the temporal variation; and
    an updating unit that updates registration data stored in the registration data storage unit, based on the input data, when it is predicted by the prediction unit that a future authentication rate will be lower than the first threshold value.

2. The authentication device according to claim 1,
    wherein the prediction unit predicts whether or not a future authentication rate will be lowered than the first threshold value, when a degree of similarity between a temporal variation of an authentication rate from a previous time point of a first period ago from a present time to a present time, and a temporal variation of an authentication rate from a previous time point by the first period, which is earlier than a first time point being a previous time point by a period included in the temporal variation, to the first time point is higher than a second threshold value.

3. The authentication device according to claim 1, further comprising:
an average determination unit that determines whether or not an average value of a previous authentication rate is lower than a third threshold value, by using history information stored in the authentication history storage unit,
wherein when it is determined by the average determination unit that an average value of a previous authentication rate is lower than the third threshold value, the updating unit updates registration data stored in the registration data storage unit, based on the input data.

4. The authentication device according to claim 3, further comprising:
a short-term determination unit that determines whether or not a latest authentication rate is lower than a fourth threshold value, by using history information stored in the authentication history storage unit,
wherein when it is determined by the short-term determination unit that a latest authentication rate is lower than the fourth threshold value, the updating unit updates registration data stored in the registration data storage unit, based on the input data.

5. The authentication device according to claim 4,
wherein the prediction unit stores reduction prediction information, indicating that a future authentication rate will be decreased, in an analysis result storage unit with respect to each user, when it is predicted that a future authentication rate will be lower than the first threshold value,
the average determination unit stores average reduction information, indicating that an average value of an authentication rate is low, in the analysis result storage unit with respect to each user, when it is determined that an average value of a previous authentication rate is lower than a third threshold value,
the short-term determination unit stores latest reduction information, indicating that a latest authentication rate is low, in the analysis result storage unit with respect to each user, when it is determined that a latest authentication rate is lower than the fourth threshold value, and
the updating unit updates registration data stored in the registration data storage unit in association with the user, when any one of reduction prediction information, average reduction information, and latest reduction information is stored in the analysis result storage unit.

6. The authentication device according to claim 5, further comprising:
a priority determination unit that determines a priority of a user, in which reduction prediction information, average reduction information, and latest reduction information are stored in the analysis result storage unit, as the highest, determines a priority of a user, in which any two of reduction prediction information, average reduction information, and latest reduction information are stored in the analysis result storage unit, as the second, third, or fourth highest, and determines a priority of a user, in which any one of reduction prediction information, average reduction information, and latest reduction information is stored in the analysis result storage unit, as the fifth highest,
wherein the updating unit updates registration data stored in the registration data storage unit with respect to higher-priority user determined by the priority determination unit.

7. The authentication device according to claim 5,
wherein the prediction unit deletes reduction prediction information stored in the analysis result storage unit when it is predicted that a future authentication rate is equal to or greater than the first threshold value,
the average determination unit deletes average reduction information stored in the analysis result storage unit when it is determined that an average value of a previous authentication rate is equal to or greater than a third threshold value, and
the short-term determination unit deletes latest reduction information stored in the analysis result storage unit when it is determined that a latest authentication rate is equal to or greater than the fourth threshold value.

8. An authentication system comprising a terminal to which biometric information is input by a user, and an authentication server which performs authentication processing,
wherein the authentication server includes:
a registration data storage unit that stores biometric information of the user as registration data;
an authentication unit that performs authentication processing by matching input data, which is biometric information input to the terminal by the user, and registration data, which is stored in the registration data storage unit;
an authentication history storage unit that stores an authentication result authenticated by the authentication unit as history information;
a prediction unit that acquires a periodic temporal variation of an authentication rate, which succeeds in authentication, using the history information stored in the authentication history storage unit, and predicts whether or not a future authentication rate is lower than a first threshold value, from an authentication rate after a previous time point by a period included in the temporal variation; and
an updating unit that updates registration data stored in the registration data storage unit, based on the input data, when it is predicted by the prediction unit that a future authentication rate will be lower than the first threshold value.

9. An authentication method comprising:
matching input data which is biometric information input by the user and registration data which is stored in a registration data storage unit in which biometric information of the user is stored in advance;
acquiring a periodic temporal variation of an authentication rate which succeeds in authentication, using history information stored in an authentication history storage unit storing a previous authentication result as history information;
predicting whether or not a future authentication rate is lower than a first threshold value, from an authentication rate after a previous time point by a period included in the temporal variation; and
updating registration data stored in the registration data storage unit, based on the input data, when it is predicted by the predicting that a future authentication rate will be lower than the first threshold value.

* * * * *